Feb. 25, 1936.  S. A. SNELL  2,031,863
WELDED ARTICLE AND PROCESS THEREFOR
Filed April 25, 1931   3 Sheets-Sheet 1

Inventor
SAMUEL A. SNELL
By Braselton, Whitcomb & Davies.
Attorneys

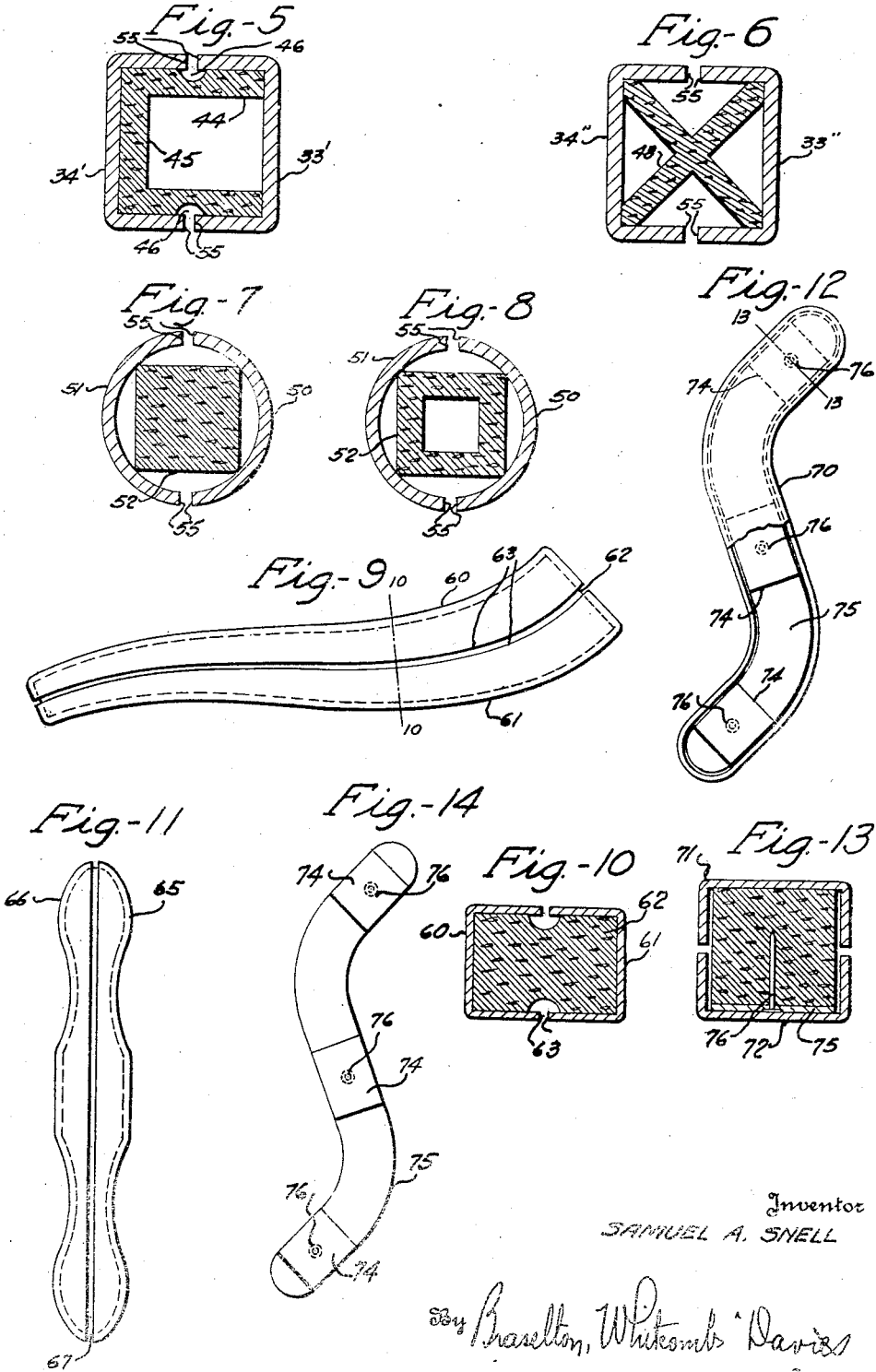

Patented Feb. 25, 1936

2,031,863

UNITED STATES PATENT OFFICE 2,031,863

WELDED ARTICLE AND PROCESS THEREFOR

Samuel A. Snell, Toledo, Ohio, assignor to The Bingham Stamping & Tool Company, Toledo, Ohio, a corporation of Ohio Application April 25, 1931, Serial No. 532,926

12 Claims. (Cl. 219—10)

This invention relates to a new and useful process or method and means of producing fused or welding constructions and also to the constructions so produced.

The invention contemplates as one of the principal objects the provision of means to retain the parts or elements to be fused together or welded in intimate contact with the means for effecting the fusion of the elements.

The invention contemplates an article formed of two or more elements welded or fused together embodying or utilizing a member or core of inexpensive material which may, if desired, be permanently fixed in the article so produced.

The invention embraces a novel means and method of welding parts together utilizing compressible material which is a substantial nonconductor of electricity for retaining the elements of the composite construction in position for welding, providing good electrical contact with the dies or work supporting means of the welding machine.

An object of my invention is fabrication of a composite welded article embodying a core member of sound damping material which is adapted to be permanently embedded in the finished article after the welding operation has been completed.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of certain forms of the invention, which may be preferred, in which Figure 1 is a view of one form of welding machine suitably adapted for carrying out my invention;

Figure 5 is a sectional view of an article before welding illustrating a modified form of insert or core member;

Figure 6 is a sectional view illustrating an article having another form of core member;

Figure 7 is a sectional view showing an article and core arrangement of different configuration;

Figure 8 is a view similar to Figure 7 showing a modified core arrangement;

Figure 9 is an elevational view of an article of irregular contour illustrating an arrangement of my invention;

Figure 10 is a vertical sectional view taken substantially on the line 10—10 of Figure 9;

Figure 11 is an elevational view of a composite article of modified configuration prior to the welding operation;

Figure 12 is an elevational view showing still another form of article embodying another form of core arrangement;

Figure 13 is a sectional view taken substantially on the line 13—13 of Figure 12;

Figure 14 is a detail view of the core arrangement as illustrated in Figures 12 and 13.

The process of my invention may be carried out and the article constructed by the utilization of machines of several types, and while I have disclosed my invention as being carried out upon a welding machine of the so-called electrical flash welder, it is to be understood that I contemplate the utilization of my process with all kinds of machines wherever the same is found to be applicable and to produce all kinds of fused or welded articles of various forms and configurations and that the several illustrations of various articles of my invention disclosed herein are illustrative only of articles which may be manufactured in accord with my invention.

Figure 1:
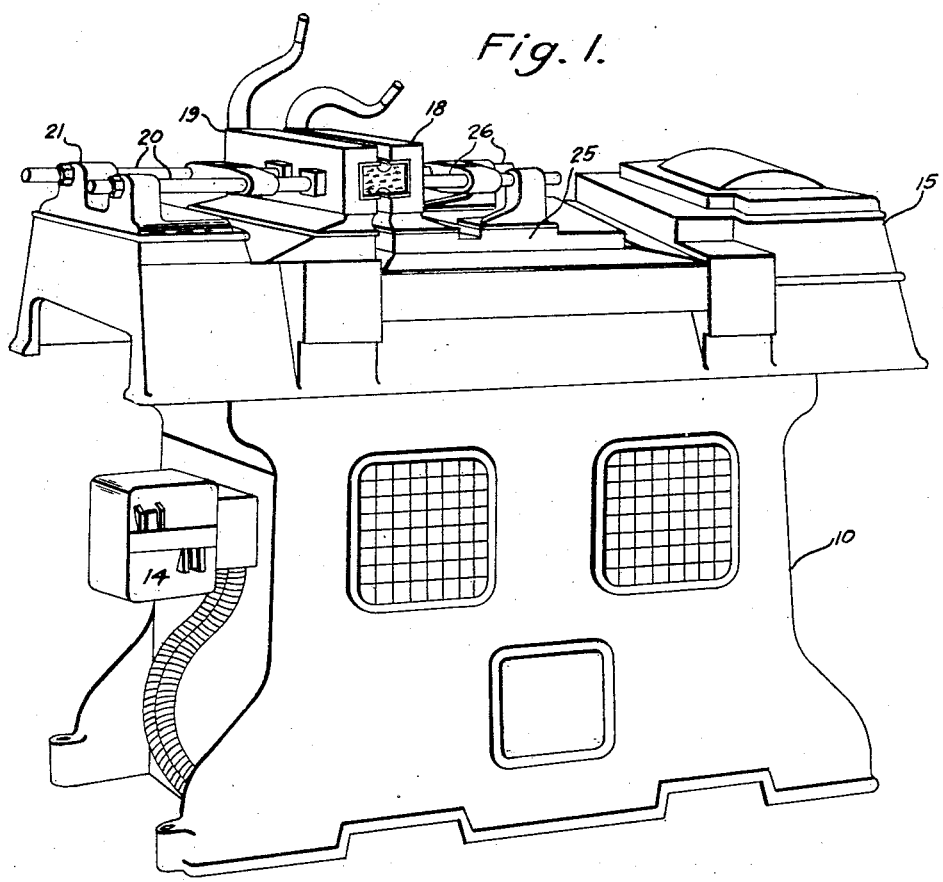
Figure 2:
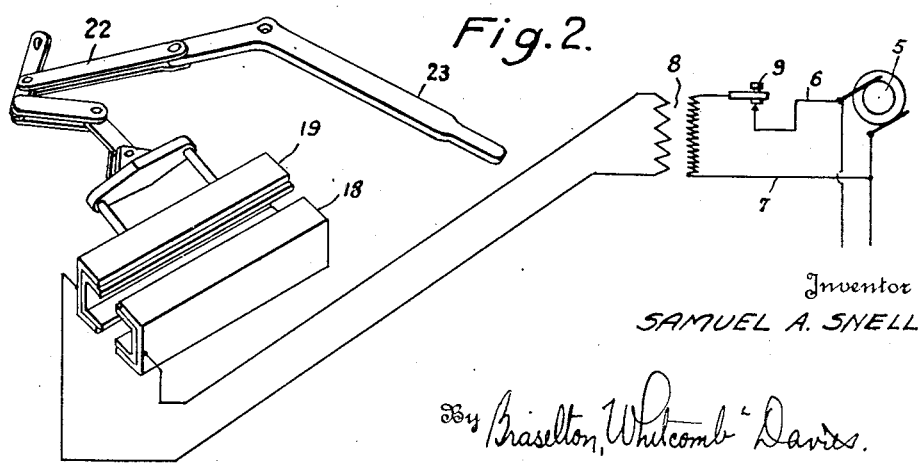
Figure 2 is a diagrammatic view showing a type of welding circuit and a means associated therewith to produce a welding operation.

Referring to the drawings in detail, the welding machine comprises a base frame member 10 within which is positioned transformer units and other associated mechanism (not shown) forming part of the usual electric welding or fusing machine, the current conductors being brought out from the interior of the machine to a terminal box 14 arranged at one end thereof for connection to a current supply. The upper portion 15 in the frame 10 forms a means for supporting the welding dies or article supporting means 18 and 19, one or both of these dies of which are arranged for movement relative to the machine so as to clamp the work therebetween during the welding operations. In the particular form illustrated the die 19 is mounted capable of movement relative to the frame member 15 through the medium of rods 20 which may be moved longitudinally relative to projections 21 formed upon the frame member 15. The die 19 during the normal operation of the machine is not adjusted, and its position is altered only when it is desired to change the size and shape of the work to be welded. The die 18 is arranged for movement relative to the die 19 to move one element of the article to be welded into welding relation with the other element held by the die 19. The die 18 is movable by suitable means of a suitable linkage and handle mechanism (not shown) in Figure 2 this means being diagrammatically illustrated as manually operated as by linkage 22 and handle 23, but it is to be understood that any suitable form of manual or automatic operative mechanism for performing the welding operation may be employed as this mechanism forms no essential part of the present invention.

The machine may be automatic in its operation including automatic timing of the fusing or welding arc prior to the actual engagement of the parts for welding, and automatic current cut-off when the weld has been completed. The die 18 is adjustably connected to a movable or platen member 25 by means of rods 26 which may be adjusted so that various sizes of work may be accommodated for welding between the dies 18 and 19.

The dies 18 and 19 are insulatingly supported so that there is no electrical connection between them except through the work carried thereby. The electrical circuit for carrying out my invention may be of any conventional type either utilizing direct or alternating current. For purposes of illustration I have shown in Figure 2 in diagrammatic form some of the essential elements in which numeral 5 designates a generator or alternator 5 connected by cables 6 and 7 to a suitable transformer 8, whose secondary is in turn connected to the dies or article supports 18 and 19, the work supported in these dies serving to complete this transformer circuit. A switch 9 may be interposed in the output circuit of the generator to initiate the welding operation. Other instrumentalities may in practice be incorporated to effectively and efficiently regulate and control the welding operation which are well known to a person skilled in the art.

Figure 3:
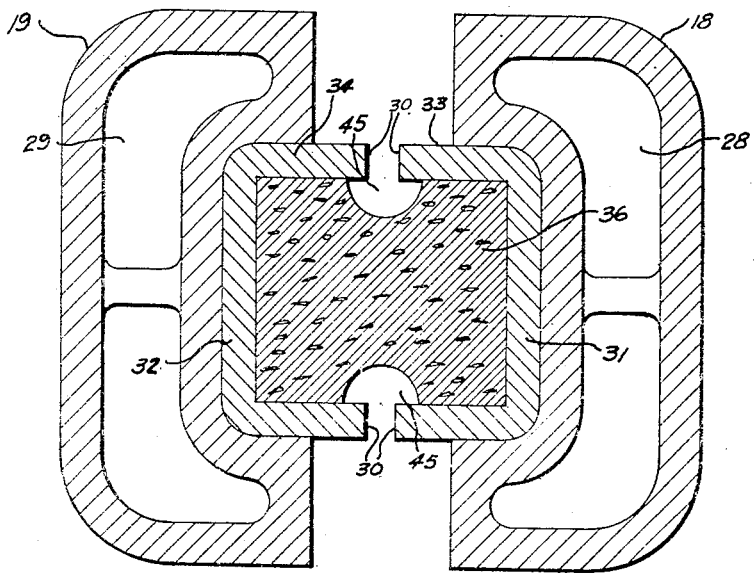
Figure 3 is an enlarged sectional view showing the arrangement of elements of an article prior to the welding or fusing operation.
Figure 4:
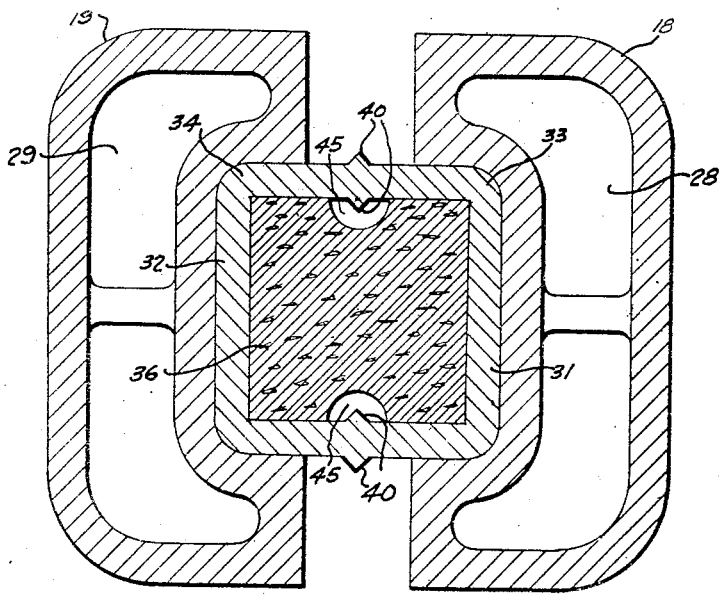
Figure 4 is a view similar to Figure 3 showing the arrangement of parts after the completion of a welding operation.

As illustrated in Figures 3 and 4, these dies or article supporting means are preferably formed with chambers 28 and 29 for receiving a cooling medium as, for example, water, oil, or the like, to prevent the dies from becoming excessively heated. In carrying out the process of my invention with particular reference to Figures 3 and 4, I have illustrated the current conducting dies as utilized in welding the edges 30 of channel shaped metallic elements 33 and 34, the intermediate portions 31 and 32 of the channel members lying in suitable recesses in the dies 18 and 19. An adequate area of contact must be secured between the walls of the recesses of the dies 18 and 19 and the adjacent exterior surfaces of the channel members 33 and 34 during the welding operation to avoid heating in spots other than at the places where welding is desired. The welding current being of such comparatively high amperage, a large area of contact between the work and the dies must be had in order to adequately carry the current without heating. If this contact is not adequate over a relatively large area, the current will pass only through the limited points of contact, causing heating in spots in the work, which results in buckling and breaking down of the walls of the article and preventing the welding of the work. In order to obviate these difficulties, I have provided a member 36 preferably fabricated of resilient or compressible material which is substantially a non-conductor of electricity as, for example, gum, caoutchouc, fiber, compressed pulp, wood, or the like having a resistance to distortion sufficient to hold the work or article elements 33 and 34 in good electrical contact with the dies 18 and 19, yet sufficiently compressible as to permit die 18 to be moved toward die 19 to bring the edges 30 of the work sufficiently close to cause an arc to pass therebetween, thus locally heating the edges 30 to a fusing heat or welding temperature. After the edges 30 of the channel members or article elements have been raised to a suitable welding temperature, the die 18 is moved toward die 19 to bring the elements into engagement, thus causing a fusing or bonding of the elements of the article. In some instances the heated metal at the weld or bond moves laterally, usually called "flash" which is illustrated as at 40 in Figure 4. Because of this "flash" or excess metal, it may be desirable to form the core member to accommodate this "flash" and in the illustration of Figures 3 and 4 I have provided recesses 45.

Figure 5 illustrates an article similar to the one shown in Figure 4 prior to the welding operation, this form of the invention embodying a core element or member of substantial U-shape designated 44 in which the two edges of the core member engage the rear wall of the channel member 33' while the bight portion 45 of member 44 engages the inner wall of channel member 34'. The side walls of the core member are preferably recessed as at 46 to provide means for accommodating the flash occurring during the welding operation, however this is not essential as the side wall portions of the core are capable of lateral distortion to take care of this condition.

The form of composite article of my invention illustrated in Figure 6 comprises channel members 33" and 34" within which is positioned a compressible core member 48 of X-formation the extremities of the four projections of the core member engaging the respective corners formed in the channel members 33" and 34" whereby the same are held in adequate electrical contact with the recesses in the welding dies 18 and 19.

Figure 7 illustrates an article composed of semi-annular sections 50 and 51 which are separated by means of a substantially rectangular core member 52 of compressible material. In the illustration the parts are shown in the proper arrangement just prior to the welding operation. It will be obvious that this type of core accommodates the "flash" without additional recessing.

Figure 8 illustrates the article formed of semi-annular sections 50 and 51 circumscribing a hollow rectangular core member 52, which may in some articles be utilized as effecting a saving in weight and material. In the forms of my invention illustrated in Figures 5 to 8, inclusive, the articles are welded along the edges 55 to form hollow finished articles preferably formed of sheet metal.

The process of my invention is particularly adaptable for use in fabricating articles of irregular contour or of varying cross section. An article having these characteristics is illustrated in Figures 9 and 10, the article comprising two similarly shaped channel cross section members 60 and 61 embodying or enclosing a core member 62 similar to that illustrated in the form of my invention shown in Figures 3 and 4. The core member 62 may be moulded to substantially the shape of the finished article or of a modified contour prior to its insertion in the elements to be welded. In these figures the elements of the article are illustrated in their predetermined arrangement just prior to the welding operation along the lines 63.

Figure 11 illustrates a handle member formed of two elements 65 and 66 surrounding or embodying core member 67 which may be of any form similar to those herein described. It will be obvious that the articles illustrated in Figures 9 and 10 and 11 completely enclose the compressible core member after the welding is completed while in the other forms of the invention hereinbefore described the core member may be permanently retained within the welded members or when the ends are open the same may be removed should this be found to be desirable. I have found, however, that a core member of the character herein described when retained as a permanent part of the composite article performs an additional function of damping the period of vibration of such metallic articles whereby obnoxious sounds or rattles are reduced to a minimum. As has been previously explained, the core member is compressed sufficiently during the welding operations that even though a portion of the surface of the core member in engagement with the metallic elements of the article should char or burn, this burning will not cause a looseness of the core member in the finished structure as the charring ceases upon the consummation of the oxygen present within the welded structure.

Figures 12 and 13 illustrate an irregular shaped composite article 70 formed of two channel like members 71 and 72. The core member is made of several blocks 74 of compressible material which are connected together by means of a flexible strip 75, the blocks being nailed as at 76 to the flexible strip or otherwise secured thereto. This construction is particularly adaptable for use in retaining comparatively large members in electrical contact with the welding dies during the welding operation and wherein several blocks positioned at intervals will adequately serve to prevent distortion of the sheet metal channel members. The core assembly comprising the blocks 74 and a flexible strip 75 are particularly illustrated per se in Figure 14.

It is apparent that, within the scope of the invention modifications and different arrangements may be made other than is herein disclosed, and the present disclosure is illustrative merely, the invention comprehending all variations thereof.

What I claim is:—

1. The method of producing a composite article which consists in compressing a non-metallic member in contact with the elements of the article by movement of the elements toward each other and fusing the juxtaposed portions of the elements to form an integral structure.

2. A method of producing a composite article which consists in positioning a member of fibrous compressible material in contact with the elements of the article for normally separating the elements; of bringing portions of the elements in juxtaposition and distorting the member; and fusing adjacent edges of the elements to form an integral structure.

3. The method of producing a composite article which consists in positioning a core of substantially nonconducting material in contact with and between portions of the elements comprising the article for retaining the elements in spaced relation; of bringing certain portions of the elements in juxtaposition; of producing an electric arc therebetween for a predetermined period of time to heat said portions; of moving the heated portions together for resiliently retaining the elements in spaced relation; and forming a fused joint.

4. The method of producing a composite article which consists in compressing a core of fibrous material between the elements comprising the article; of bringing certain edges of the elements in juxtaposition; of producing an electric arc therebetween to heat the edges; and of subsequently moving the heated portions together forming a fused joint.

5. The method of producing a welded article which consists in positioning a core of non-metallic compressible material between elements of the article for resiliently retaining the elements in spaced relation, and of heating adjacent portions of the elements and subsequently moving said elements wherein the heated edges are brought together compressing the core between the elements and fusing the edges thereof to form an integral structure.

6. The method of holding a plurality of elements in intimate relation with welding dies which consists in positioning a fibrous compressible member between the elements for retaining the elements in contact with the dies and in proper spaced relation prior to and during welding.

7. A core for a hollow member comprising a member of compressible material normally of larger dimension than the interior dimension of the hollow member, said member having recesses to accommodate distorted metal of the hollow member.

8. A core comprising a member, a plurality of compressible blocks of insulating material secured to said member.

9. A core for hollow members comprising a member of molded compressible material having a contour substantially coincidental with the interior contour of the hollow members, said core being normally of a dimension larger than the interior dimension of the hollow members.

10. The method of effecting a flash weld between the edges of complementary blanks, which consists in employing a yielding resistance of fibrous insulating material interposed between the blanks to hold the surfaces to be welded in suitable relation for flashing, and applying a push-up pressure against the counter-resistance of said member to force the blanks together to complete the weld.

11. An article of manufacture fabricated of sheet metal elements, certain portions of said elements being welded together forming a hollow metallic structure; and a permanent core member formed of compressible electrical insulating material compressibly interposed within said hollow metallic structure.

12. An article fabricated of metal elements, certain of said elements being welded together forming a hollow structure, and a core member of non-metallic compressible insulated material permanently retained under stress of compression within said hollow member.

SAMUEL A. SNELL.

CERTIFICATE OF CORRECTION.

Patent No. 2,031,863. February 25, 1936

SAMUEL A. SNELL.

It is hereby certified that error appears in the printed specification of the above numbered patent requiring correction as follows: Page 3, second column, lines 6 and 7, claim 3, strike out the words "for resiliently retaining the elements in spaced relation" and insert instead whereby the core is distorted; and that the said Letters Patent should be read with this correction therein that the same may conform to the record of the case in the Patent Office.

Signed and sealed this 14th day of April, A. D. 1936.

(Seal)

Leslie Frazer
Acting Commissioner of Patents.